United States Patent [19]

Hopper, Jr.

[11] 4,412,706
[45] Nov. 1, 1983

[54] BICYCLE SEALED BEARING AND METHOD

[76] Inventor: Willard C. Hopper, Jr., 4850 Trail, Norco, Calif. 91760

[21] Appl. No.: 227,642

[22] Filed: Jan. 23, 1981

[51] Int. Cl.³ .............................................. F16C 33/00
[52] U.S. Cl. ................................. 308/192; 308/189 R
[58] Field of Search ................... 308/192, 23.5, 179.5, 308/191, 190, 189 R; 384/431

[56] References Cited

U.S. PATENT DOCUMENTS

| | | | |
|---|---|---|---|
| 559,902 | 5/1896 | Marceau | 308/192 |
| 3,903,754 | 9/1975 | Morroni | 308/192 X |
| 4,093,325 | 6/1978 | Troccaz | 308/192 |
| 4,235,488 | 11/1980 | Maddick | 308/179.5 X |

FOREIGN PATENT DOCUMENTS 899501  6/1945  France ................... 308/192

Primary Examiner—Stuart S. Levy
Assistant Examiner—Daniel P. Stodola
Attorney, Agent, or Firm—Harvey S. Hertz

[57] ABSTRACT

A sealed bearing unit is used to replace the conventional bearings of the bicycle hub. The bearing unit is preformed and secured in a bearing collar unit. The bearings used in the bicycle hub are removed and the bearing collar unit is machined to form fit in the wheel hub.

1 Claim, 3 Drawing Figures

BICYCLE SEALED BEARING AND METHOD

BACKGROUND OF THE INVENTION

1. Field of the Invention

The field of art to which the invention pertains includes the field of bicycle wheel bearings, particularly, with respect to a universal collar unit containing sealed bearings therein which can be machined to fit most bicycle wheel hubs.

2. Description of the Prior Art

Conventional bicycle wheel hubs are rotatably mounted on an axle through a hub bearing assembly. Normal bicycle bearing assemblies do not use sealed bearings, thus requiring frequent repacking thereof. While certain bicycles are provided with sealed bearing units, these devices are specially manufactured for each bicycle. Known prior art includes U.S. Pat. Nos. 4,145,095; 3,967,856; 3,903,754; 3,241,894; 1,375,149; 3,922,018; and 1,414,270.

The present invention utilizes a sealed bearing unit for use with bicycle wheel hubs. The sealed bearing unit is premounted in a stock bearing collar unit. The collar unit is designed to be fit by machining into most bicycle wheel hubs, thus enabling most bicycle wheels to be provided in a relatively simple and inexpensive fashion with sealed bearing units.

SUMMARY OF THE INVENTION

A bicycle sealed bearing unit is utilized to replace the conventional bearings positioned in the bearing cup of a bicycle wheel hub. The sealed bearing unit is mounted in a bearing collar unit. The collar unit is machined so that it can fit into the wheel hub adjacent to the bearing cup.

The advantages of this invention both as to its construction and mode of operation will be readily appreciated as the same becomes better understood by reference to the following detailed description when considered in connection with the accompanying drawing in which like reference numerals designate like parts throughout the figures.

DESCRIPTION OF THE PREFERRED EMBODIMENTS

Figure 1:
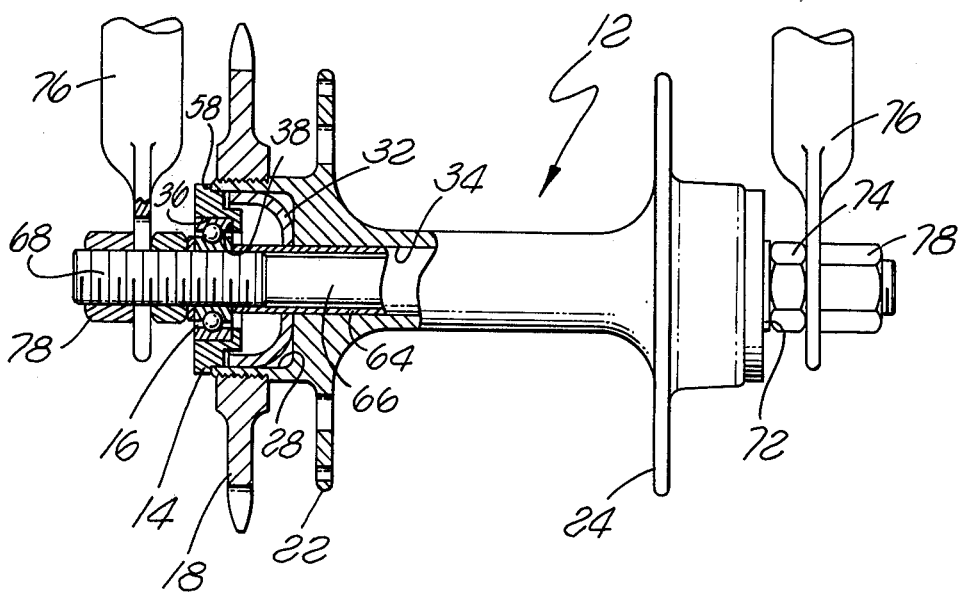
FIG. 1 is a plan view, partly in cross section, illustrating the mounting of the field bearing unit in a conventional bicycle wheel hub assembly.

Referring now to the drawings, there is shown in FIG. 1 bicycle wheel hub assembly 12 which has had a bearing collar unit 14 containing a sealed bearing assembly 16 fitted in the bearing collar unit. The bicycle wheel hub assembly 12 is of conventional configuration, one-half of which is shown in cross-section.

The hub assembly 12 includes a driving sprocket 18 which is threaded onto the hub assembly at one end thereof. In addition, a pair of flanges 22, 24 are formed as part of the hub assembly for use in securing wheel spokes thereto. Each end of the bicycle wheel hub assembly 12 contains a bore 28 into which a bearing cup 32 is inserted. The bearing cup 32 normally contains bearings (not shown) which have been removed to enable insertion of the bearing collar unit 14 into the hub assembly bore 28.

The hub assembly 12 further includes an axle bore 34 through which the bicycle wheel axle normally extends. The assembly described thus far is conventional and is normally found in most bicycles sold today.

Figure 2:
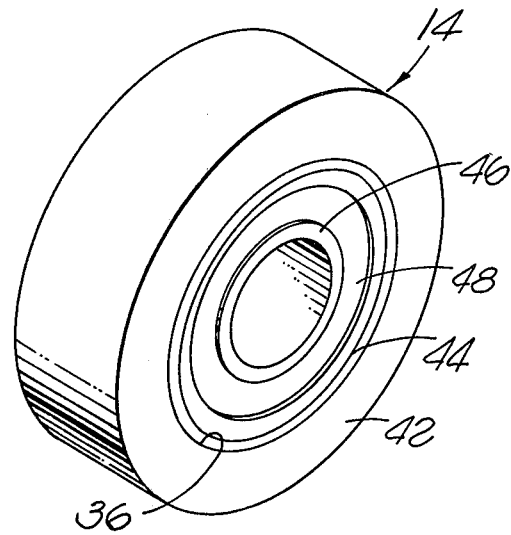
FIG. 2 is a plan view of the bearing collar unit and sealed bearing assembly prior to machining.

Referring now to FIG. 2 there is shown the bearing collar unit 14 and the sealed bearing assembly 16 as viewed from either end of the hub assembly FIG. 1. The bearing collar unit 14 is of cylindrical design and contains an interior bore 36 which terminates at a shoulder 38 (FIG. 1). The sealed bearing assembly 16 is inserted into the bearing collar unit interior bore 36 until it abuts the shoulder 38. The bearing assembly 16 is then generally flush with the outer side surface 42 of the bearing collar unit 14.

Figure 3:
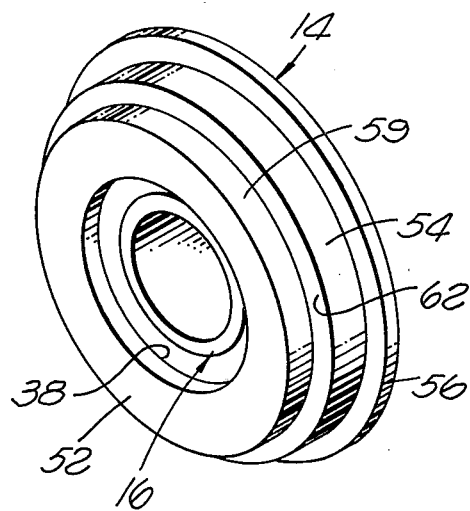
FIG. 3 is a perspective view of the bearing collar unit after it has been machined for insertion in the wheel hub assembly of FIG. 1.

The sealed bearing assembly 16 is of conventional design and includes an outer race 44 and inner race 46 and a cover 48 which prevents dirt from entering the sealed bearing assembly. The outer race 44 forms a tight fit with the collar unit interior bore 36. As viewed in FIG. 3, the inner race 46 and the cover 48 are recessed from the outer side surface 52 of the bearing collar unit 14 since the bearing assembly outer race 44 abuts the collar unit shoulder 38.

Once the bearing collar unit 14 of FIG. 2 is ready for insertion into the bicycle wheel hub assembly 12, the outer diameter of the collar unit 14 is machined so that a surface diameter 54 forms a tight fit in the hub assembly bore 28. All that remains from the original outer diameter of the collar unit 14 is a shoulder 56 which abuts the outer edge 58 of the hub assembly.

The outer diameter of the collar unit 14 adjacent the second outer side surface 52 is then machined to a thickness such that the collar unit 14 can be inserted into the bearing cup 32 and be slightly spaced therefrom. This second surface diameter 59 terminates at an inwardly facing shoulder 62 adjacent the first surface diameter 54 such that when the collar unit 14 is inserted into the hub assembly bore 28, the shoulder 62 will be slightly spaced from the edge of the bearing cup 32. This spacing has been found to be necessary as most bearing cups are not accurately machined and the edge thereof may not be formed in an exact plane.

After one of the collar units containing the sealed bearing assembly 16 have been inserted into the hub assembly, a cylindrical spacer 64 is inserted from the other end of the hub assembly. The end edges of the spacer 64 abut the inner race 46 of the sealed bearing assembly 16 and thus, absorbs side thrust when the wheel axle 66 is secured to the assembly as will be seen hereinafter.

After both bearing collar units 14 have been mounted on the hub assembly 12, the wheel axle 66 is inserted through the spacer 64. The threaded ends 68 of the wheel axle 66 extend beyond the outer ends of sealed bearing assembly 16. A washer 72 is normally placed onto the wheel axle 66 which then abuts the sealed bearing assembly 16. Then a nut 74 is fastened onto the wheel axle 66 until it abuts the washer 72. After the bicycle wheel fork 76 has been placed on the wheel axle 66 an outer nut 78 secures the bicycle fork thereon.

As can be readily seen the present invention enables a sealed bearing unit to be easily placed on a bicycle wheel hub assembly. The bearing cup previously used to hold the bearings need not be removed and a simple machining of the bearing collar unit is all that is necessary.

I claim:

1. A combined sealing bearing unit having an inner race and outer race pre-formed in a generally cylindrical collar for mounting in a bicycle wheel hub bore comprising:

an inner bore formed in said collar terminating at an interior shoulder wherein said sealed bearing unit outer race abuts said interior shoulder, said interior shoulder formed in a plane perpendicular to said inner bore axis, said interior shoulder facing in a first direction;

said cylindrical collar further comprising a first reduced diameter and a second reduced diameter section; said first and second reduced diameter sections being axially aligned with said inner bore axis, said first and second reduced diameter sections each terminating at one end at a central shoulder formed in a plane parallel to said interior shoulder and facing in a second direction; said first reduced diameter section terminating at its second end at a second shoulder facing in said second direction, for enabling said first reduced diameter section to form a tight fit in said bicycle wheel hub bore and said second reduced diameter section to be spaced from an irregular surface in said hub bore.

* * * * *